C. F. PIKE.
TRAP FOR CATCHING PORPOISES.
APPLICATION FILED SEPT. 11, 1909.
972,227.
Patented Oct. 11, 1910.
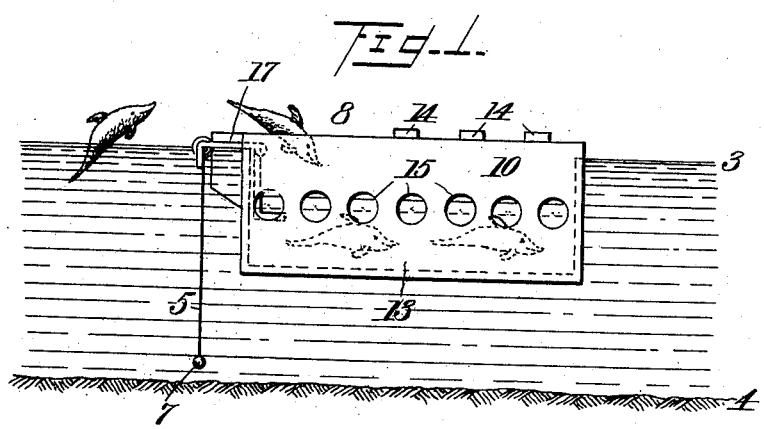
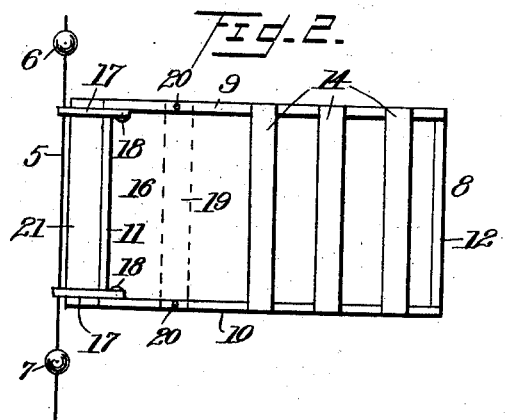
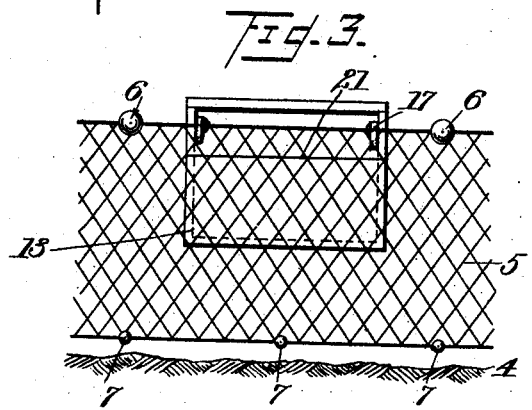
Witnesses
E. E. Duffy
John Devlin
Inventor
Charles F. Pike
by Wm. A. Pike
Attorney

UNITED STATES PATENT OFFICE.

CHARLES F. PIKE, OF PHILADELPHIA, PENNSYLVANIA.

TRAP FOR CATCHING PORPOISES.

972,227.  Specification of Letters Patent.  Patented Oct. 11, 1910.

Application filed September 11, 1909. Serial No. 517,247.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, (Case D,) of which the following is a specification.

My invention relates to devices for catching fish and especially for catching the porpoise. In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof. The porpoises generally swim near the surface of the water and while they will to some extent pass through the opening in the obstruction placed in their path, they will be very liable, when they meet an obstruction, to jump over it and thus be lost to the fisher.

The general object of my invention is to provide means whereby the fish will be caught after jumping over the obstruction and thus avoid the loss of such a large number as would occur in the use of the means now provided.

The special object of the present invention is to provide means for catching the porpoise of such construction that it may be floated close to and removably attached to the obstruction and to receive the fish jumping over the obstruction directly into a receptacle of sufficient size to receive a number of the fish and serve as a live box to be floated or towed off to the point at which it is to be emptied.

I have illustrated an embodiment of the invention in the accompanying drawing, in which:

Figure 1 is a side elevation of one form of receptacle constructed in accordance with my invention, removably attached to an obstruction. Fig. 2 is a top plan view, and Fig. 3 is a front elevation of the device as shown in Fig. 1.

Referring specifically to the drawing, 3 indicates the surface and 4 the bottom of a body of water in which the apparatus is to be operated. An obstruction, in this instance, an ordinary seine, is shown at 5 supported by floats 6 of any ordinary kind at the surface of the water and held down by any ordinary weights or sinkers 7 at the bottom.

At 8 is shown a trap in the form of a floating box or live box which is composed of sides 9, 10, ends 11, 12, bottom 13, and top slats 14. This live trap is shown as of rectangular form but such form may be varied so long as the construction is such as to permit of its being placed with the upper edge of its front end 11 near the obstruction 5.

The sides of the traps 8 are shown as perforated, or provided with openings 15 to admit of the free flow of water through them but other forms might be used to accomplish the same result. Three top slats 14 are shown but their number may be varied, the one nearest the obstruction being so placed as to leave an opening 16 in the top of sufficient size to readily receive the fish jumping over the obstruction.

The live box is provided at or near its front end with hooks 17 pivoted at 18 on horizontal pivots so that they may be engaged over the float line of the obstruction as shown in full lines in all of the figures, to removably attach the box to the obstruction, or turned over into the box out of the way as shown in dotted lines in Fig. 1.

The slats 14 are rigidly secured in place close enough together to prevent the fish caught therein from jumping out, and if deemed advisable, one or more removable slats, as shown at 19 in dotted lines in Fig. 2, may be used when moving the trap away from the obstruction, the slat 19 being shown as secured by a removable pin 20 at each end, although any other method of temporarily securing them may be used.

At the forward end of the trap or live box there may be provided a fender or projection 21 as shown in Figs. 1 and 2, to serve to prevent the main body of the structure from contacting with the obstruction when secured thereto.

In operation, the obstruction is placed in the path of the porpoise and the trap or live box moved into the position shown and secured by the hooks. When the porpoise reach the obstruction, they will, as is their habit, jump over it and drop into the trap through opening 16. When the desired number have been caught, the hooks are removed from the obstruction and folded into the position shown in dotted lines in Fig. 1, inside the trap, and temporary slats 19 put in place, if any are used, when the trap may be towed to any desired point for removing the porpoise therefrom. The use of these expedients will obviate the removal of the traps from the porpoise to vessels off shore and will keep the porpoise alive until the packing plant is reached.

Having fully described my invention, what I claim and desire to secure by Letters Patent, is—

1. Apparatus of the character described, comprising an obstruction, and a floating trap or live box in the rear thereof and at a right angle thereto, provided with means for removably connecting it directly to the obstruction and an opening in the top of the trap at the edge adjacent to the obstruction to receive porpoises jumping over the obstruction.

2. Apparatus of the character described, comprising an obstruction, and a floating trap or live box in the rear thereof and at a right angle thereto, provided with means for removably connecting it directly to the obstruction, and an opening in the top of the trap at the edge adjacent to the obstruction to receive porpoises jumping over the obstruction, and means for preventing the porpoises from jumping out of the trap.

3. Apparatus of the character described, comprising an obstruction, and a floating trap or live box in the rear thereof and at a right angle thereto, provided with means at the end adjacent to the obstruction for removably connecting the trap to the obstruction, said connecting means being adapted to be folded over into the trap when not in use.

4. Apparatus of the character described, comprising an obstruction, and a floating trap or live box in the rear thereof and at a right angle thereto, provided with means at the end adjacent to the obstruction for removably connecting the trap to the obstruction, said connecting means being adapted to be folded over into the trap when not in use, and a fender to prevent the body of the trap from contacting with the obstruction when secured thereto.

5. Apparatus of the character described, comprising an obstruction, and a floating trap or live box in the rear thereof and at a right angle thereto, provided with means at the end adjacent to the obstruction for removably connecting the trap to the obstruction, said connecting means being adapted to be folded over into the trap when not in use, and an opening in its top near the end adjacent to the obstruction, to receive porpoises jumping over the obstruction, and slats covering the trap beyond the opening.

6. Apparatus of the character described, comprising an obstruction, and a floating trap or live box in the rear thereof and at a right angle thereto, provided with means at the end adjacent to the obstruction for removably connecting the trap to the obstruction, said connecting means being adapted to be folded over into the trap when not in use, and an opening in its top near the end adjacent to the obstruction to receive porpoises jumping over the obstruction, and removable means for preventing porpoises from jumping out of the trap through said opening.

7. Apparatus of the character described, comprising an obstruction, and a floating trap or live box in the rear thereof and at a right angle thereto, provided with means at the end adjacent to the obstruction for removably connecting the trap to the obstruction, said connecting means being adapted to be folded over in to the trap when not in use, and an opening in its top near the end adjacent to the obstruction to receive porpoises jumping over the obstruction, removable means for preventing porpoises from jumping out of the trap through said opening, and slats covering the top of the trap beyond the opening.

In testimony whereof I affix my signature in presence of two witnesses.

CHARLES F. PIKE.

Witnesses:
 WM. A. PIKE,
 JOHN DEVLIN.